United States Patent [19]

Yagi

[11] Patent Number: 5,652,377
[45] Date of Patent: Jul. 29, 1997

[54] SCANNING METHOD WITH SCANNING PROBE MICROSCOPE

[75] Inventor: Akira Yagi, Sagamihara, Japan

[73] Assignee: Olympus Optical Co., Ltd., Tokyo, Japan

[21] Appl. No.: 544,117

[22] Filed: Oct. 17, 1995

[30] Foreign Application Priority Data

Oct. 24, 1994 [JP] Japan .................................... 6-258191

[51] Int. Cl.$^6$ ..................................................... G01B 5/28
[52] U.S. Cl. ............................................................ 73/105
[58] Field of Search ............................... 73/105; 250/306, 250/307

[56] References Cited

U.S. PATENT DOCUMENTS

| | | | |
|---|---|---|---|
| 5,168,159 | 12/1992 | Yagi | 250/306 |
| 5,267,471 | 12/1993 | Abraham et al. | 73/105 |
| 5,280,341 | 1/1994 | Nonnenmacher et al. | 250/306 X |
| 5,391,871 | 2/1995 | Matsuda et al. | 73/105 X |
| 5,406,832 | 4/1995 | Gamble et al. | 73/105 |
| 5,436,448 | 7/1995 | Hosaka et al. | |
| 5,440,121 | 8/1995 | Yasutake et al. | 250/306 |

OTHER PUBLICATIONS

S. Hues et al., "Scanning Probe Microscopy of Thin Films", MRS Bulletin, Jan. 1993, pp. 41–49.

P. Hobbs et al., "Atomic Force Microscope: Implementations", Scanning Microscopy Technologies and Applications, SPIE vol. 897, 1988, pp. 26–30.

M. Radmacher et al., "From Molecules to Cells: Imaging Soft Samples with the Atomic Force Microscope", Science, vol. 257, 25 Sep. 1992, pp. 1900–1905.

Y. Martin et al; "Atomic Force Microscope—Force Mappling and Profiling On A Sub 100–A Scale"; May 15, 1987; pp. 4723–4729; Journal of Applied Physics; vol. 61; No. 10.

*Primary Examiner*—Hezron E. Williams
*Assistant Examiner*—Daniel S. Larkin
*Attorney, Agent, or Firm*—Frishauf, Holtz, Goodman, Langer & Chick

[57] ABSTRACT

A scanning method with a scanning probe microscope, wherein the scan time and the timing of data measurement are optimized on the basis of transient characteristics of vibration of the cantilever, and the ruggedness of the sample surface and the influence of the magnetic force inclination are measured in one scanning process, at every point of measurement, using a magnetic probe, so that the ruggedness of the sample surface and the magnetic force distribution are separately detected.

12 Claims, 4 Drawing Sheets

SCANNING METHOD WITH SCANNING PROBE MICROSCOPE

BACKGROUND OF THE INVENTION

1. Field of the Invention

The present invention relates to a scanning method with a scanning probe microscope by which surface information such as a shape or a magnetic force distribution of a surface of a sample, can be obtained by means of scanning with a probe.

2. Description of the Related Art

In general, various microscopes are known as scanning probe microscopes, which include an atomic force microscope (hereinafter referred to as AFM) for detecting interaction force between a sample and a probe by a cantilever and a magnetic force microscope (hereinafter referred to as MFM) using a magnetic body as a probe of the AFM.

The AFM performs two typical operations.

One of them is an operation for detecting ruggedness of a sample by means of maintaining interaction force between the sample and a probe, as disclosed in, for example, U.S. Pat. No. 5,436,448.

The other is an operation called an AC mode, for detecting variation of resonance characteristics of a cantilever, thereby measuring a distribution of an electric or magnetic field near a surface of a sample or a shape of the surface of the sample. This operation utilizes the characteristic of a cantilever that it appears as if the spring constant is changed in reply to force inclination, for example, an electric or magnetic field and Van der Waals attraction, which acts due to approach of a probe to a sample, as disclosed in, for example, "Atomic force microscope-force mapping and profiling on a sub 100-Å scale" by Y. Martin et al, "J. Appl. Phys. Vol 61, page 4723 (1987)".

In the AFM of the AC mode (Alternating Current mode), a probe is formed on a cantilever having a spring constant of 0.01 to several N/m and a resonance frequency of several kHz to several hundreds of kHz. The cantilever is fixed to an oscillating actuator and arranged so as to face the surface, i.e., the x-y plane, of the sample, supported by an XYZ micrometer element. The probe scans the surface of the sample in accordance with the XY scan of the sample.

During the scanning, a signal, which oscillates at a predetermined amplitude in a direction perpendicular to the sample surface in a frequency around the resonance frequency, is applied to the oscillating actuator. The XYZ micrometer element, supporting the sample and comprising a voltage element, is controlled at an accuracy of 0.1 nm or higher so as to keep the amplitude by vibration of the cantilever, which reflects z-direction dependency of the force acting between the probe and the sample. As a result, the sample is moved relative to the probe in a direction perpendicular to the sample surface, i.e., in the z direction. Consequently, the distal end of the probe traces a curve which reflects the shape of the surface of the sample.

Thus, the position in the z direction of the distal end of the probe on the xy plane is obtained on the basis of the voltage applied to a piezoelectric element and recorded, thereby obtaining an AFM image showing fine ruggedness on the sample surface.

If the distal end of the cantilever is formed of a magnetic material (e.g., CoCr or Permalloy) and the sample is formed of a magnetic material (e.g., a magnetic tape, a hard disk medium, a magnetic head, an optical magnetic disk medium), the obtained image reflects a distribution of magnetic force of the sample. In the image, the distribution of magnetic force is superimposed on the ruggedness of the sample.

To avoid the superimposition, as disclosed in, for example, U.S. Pat. No. 5,436,448 a method for removing the distribution of magnetic force from the ruggedness of the sample has been proposed. In this method, a probe is brought into physical contact with the sample at points of measurement on the xy plane, thereby obtaining positions of the contact points, then, the probe is caused to vibrate at a constant height above the contact points. Vibration amplitudes are recorded, so that a distribution of magnetic force can be obtained.

Another method for measuring only the distribution of magnetic force has been proposed, in which vibration, having such a great amplitude as not to cause the probe to be adhered to the sample, is applied to a cantilever, whereby small ruggedness information due to an influence of the magnetic force on every scanning line is picked up, while the cantilever is vibrating at a smaller amplitude for detecting magnetic force on every scanning line, so as to slightly change the height of the probe along the prestored ruggedness.

Further, as a method for measuring distribution of magnetic signals, an imaging method has been proposed, in which, a phase difference between an oscillating signal and a detecting signal is detected by means of, for example, a lock-in amplifier, so that an image can be obtained in the same manner as in a method for imaging change in amplitude of the cantilever.

However, in the above conventional method in which the probe is first brought into contact with the sample and thereafter the height of the probe is set, to release the cantilever adhered to the sample into a non-contact state, it is necessary that the cantilever be removed from the sample by, approximately 1 μm. If the contact and removal operations are repeated, the amount of movement of the probe in the z direction is increased, with the result that the indeterminacy of the position of the probe may be increased. In addition, due to the contact between the probe and the sample, the sample may be influenced by the magnetism of the probe.

In the method in which the scan for measuring the ruggedness and the scan for tracing the prestored ruggedness for measuring magnetism are performed twice for every line, the measurement position may be indeterminate due to displacement of the measurement starting position owing to the positional drift in XY direction during the scanning period.

Moreover, in the conventional scanning probe microscope, when the ruggedness of a sample is measured by means of an AFM, vibration characteristics vary every time the cantilever is exchanged. For this reason, the responsiveness of amplitude variation of the cantilever also varies every time the cantilever is exchanged. In the conventional AFM of the AC mode, the measurement is adjusted on the basis of the tracking characteristic of the detected signal under measurement, and the measurement rate is not adjusted by measuring the vibration characteristics of the cantilever in advance.

To prevent the displacement of the measurement start position or the change in the vibration amplitude, it is only necessary that ruggedness information and distribution information on magnetic force distribution be obtained with one scanning process without exchanging the cantilever.

According to U.S. Pat. No. 5,436,448, when the ruggedness and the magnetic force are alternately measured in one scanning process, the displacement of the measurement start position or the change in the vibration amplitude can be prevented. However, in the techniques disclosed in this publication, when a magnetic force distribution is measured, the probe is brought into contact with the sample, every time it is moved to a point of measurement. In this publication, no improvement is made with regard to the magnetic influence of the probe on the sample and the indeterminacy of the position of the probe due to the amount of movement in the z direction in a period when the probe adhered to the sample is released. Moreover, when the probe is released from the sample to switch the measurement of magnetic inclination to the measurement of the ruggedness of the sample surface, the cantilever is vibrated and the vibration may influence the measurement.

SUMMARY OF THE INVENTION

It is accordingly an object of the present invention to provide a scanning method with a scanning probe microscope, wherein the scan time is optimized on the basis of transient characteristics of vibration of the cantilever, and the ruggedness of the sample surface and the influence of the magnetic force inclination are measured at every point of measurement, so that the ruggedness of the sample surface and the magnetic force distribution are separately detected at predetermined timings in one scanning process.

According to the present invention, there is provided a scanning method with a scanning probe microscope comprising: a transient characteristic measuring step of measuring a transient characteristic of vibration inherent to the cantilever; a servo operation step of causing the probe to approach a sample, setting a first oscillation voltage to cause the probe to vibrate at a first predetermined amplitude, and thereafter scanning the sample with the probe; a servo signal recording step of recording a servo signal obtained by the servo operation step as information on a shape of a surface of the sample; a cantilever oscillating step of stopping the servo operation, oscillating the cantilever at a second predetermined amplitude, which is lower than the first predetermined amplitude, in a state where the cantilever is not in contact with the surface of the sample, and setting and recording a second oscillation voltage applied for the oscillation; a servo control step of, when a next servo operation is successively executed, sampling the servo signal after a predetermined period of time, which does not influence the transient characteristic, has been elapsed since scanning with the probe started; and an image analyzing step of imaging the information on the surface of the sample and distribution of magnetic force inclination.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
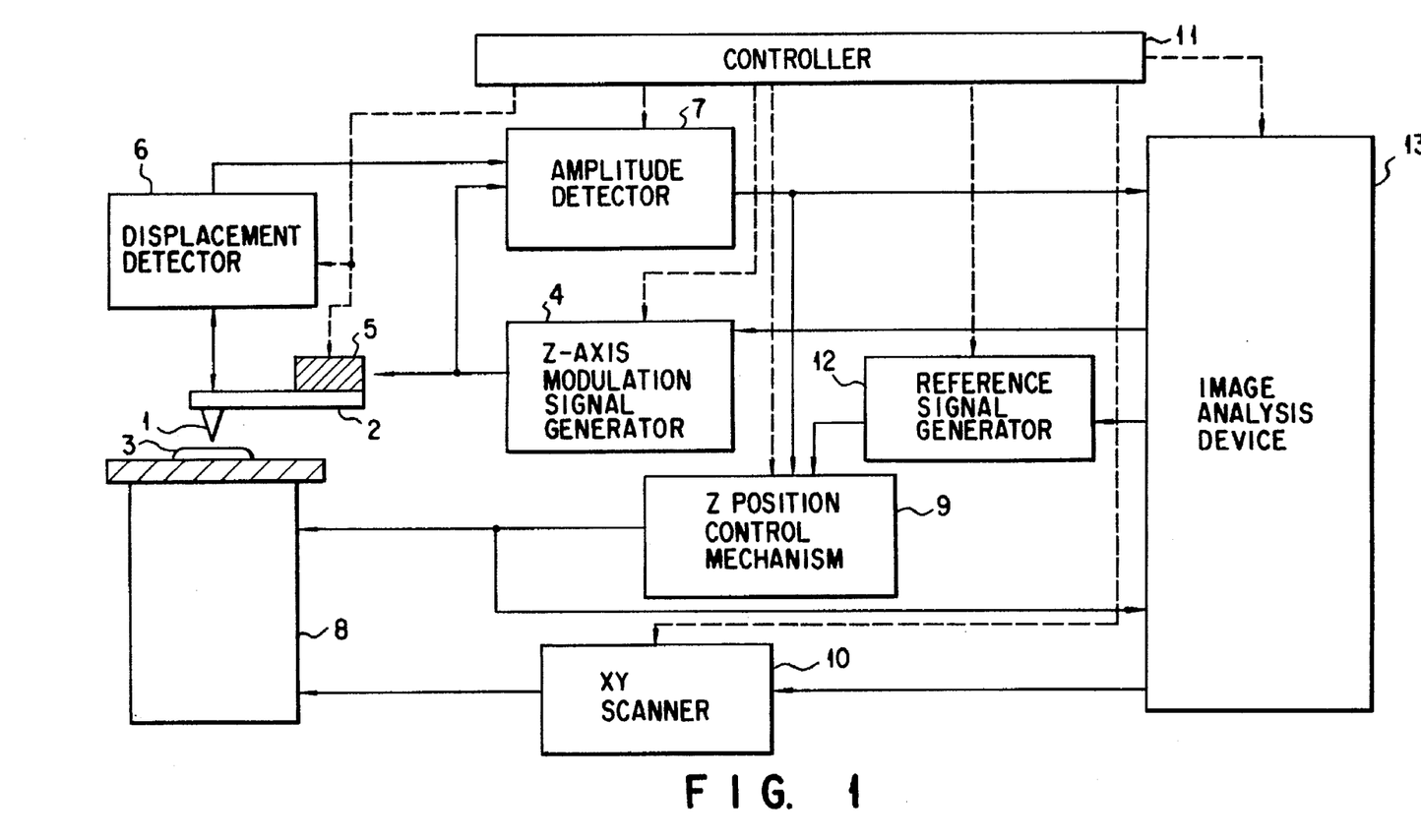
FIG. 1 is a schematic diagram showing a scanning probe microscope for explaining a scanning method with a scanning probe microscope according to a first embodiment of the present invention.

FIG. 1 is a schematic diagram showing a scanning probe microscope for explaining a scanning method according to a first embodiment of the present invention.

The scanning probe microscope comprises: a cantilever 2, an end of which is fixed to a main body of the microscope and the other end of which is a free end provided with a magnetic probe 1; a three-dimensional actuator on which a measurement sample 3 is to be mounted; an oscillating section including a z-axis modulation signal generator 4 for vibrating the cantilever 2 in a predetermined frequency and a piezoelectric actuator 5; an optical displacement detector 6 for detecting the position of the cantilever 2 by optically detecting a change in position of the rear surface of the free end of the cantilever 2 (the surface opposite to the surface on which the magnetic probe 1 is provided); an amplitude detector 7 for maintaining the distance between the center of vibration of the magnetic probe 1 and the measurement sample 3 on the basis of a displacement signal detected by the optical displacement detector 6; a servo section including the three-dimensional actuator 8 and a reference signal generator 12; a scanning section including the three-dimensional actuator 8 and an xy scanner 10 for scanning the magnetic probe 1 relative to the measurement sample 3, while a servo operation is performed; a controller 11 for controlling the above devices, collecting data and communicating with a host computer; and an imaging section including an image analysis device 13 for imaging the ruggedness of the surface of the measurement sample 3 on the basis of a control signal from the servo section and a scan signal from the scanning section.

A scanning operation of the scanning probe microscope of the above structure will be described with reference to FIGS. 1 and 4A to 4J, referring to a measurement operation of, for example, an AFM of an alternating current mode (AC mode).

First, the piezoelectric actuator 5 vibrates the cantilever 2 in a direction perpendicular to the measurement sample 3 in a predetermined frequency f on the basis of an oscillating signal output from the z-axis modulation signal generator 4.

At this time the displacement detector 6 outputs a signal in accordance with the vibration of the cantilever 2. Further, the amplitude detector 7 detects an amplitude by vibration of the cantilever 2 in synchronism with the oscillating signal of the above frequency on the basis of the oscillating vibration output from the z-axis modulation signal generator 4.

Then, the magnetic probe 1 provided integral with the cantilever 2 is caused to approach the surface of the sample at a distance of 1 μm or shorter by means of a coarse adjustment mechanism. In this state, in accordance with the instructions from the image analysis device 13, the frequency of an output signal from the z-axis modulation signal generator is varied in a range including a frequency near the resonance frequency close to proper vibration of the cantilever.

Figure 2:
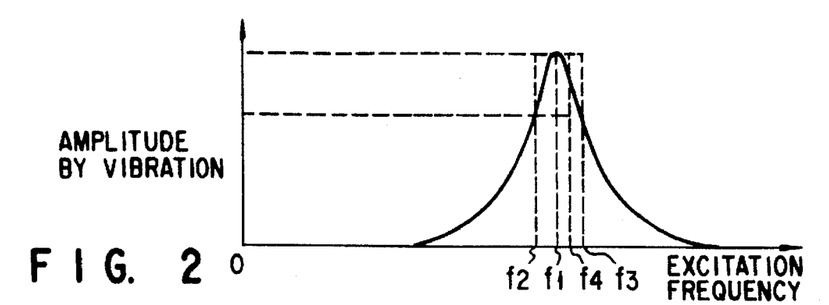
FIG. 2 is a diagram showing the relationship between the amplitude by vibration and the oscillation frequency of the first embodiment.

At this time, the image analysis device 13 picks up an output signal from the amplitude detector 7 in synchronism with the change of the frequency, and obtains the frequency characteristic of the cantilever as shown in FIG. 2. A frequency f1, which is the maximum value of the frequency characteristic, is the resonance frequency of the cantilever.

A Q value of the resonance characteristic of the cantilever is obtained by the following equation, based on frequencies f2 and f3 of $½^{1/2}$ ($1/\sqrt{2}$) of the maximum value.

$$Q = \frac{f_1}{f_3 - f_2}$$

Based on the Q value, the highest frequency, which allows the highest variation ratio of the amplitude value to the change in the frequency, is obtained by the following equation.

$$f_4 = f_1 \left( 1 \pm \frac{1}{\sqrt{8\,Q}} \right)$$

The cantilever is influenced by interaction (magnetic force or atomic force) between the sample and the probe, depending on the distance therebetween, and the resonance frequency of the cantilever is varied as if the spring constant is changed.

In contrast, according to the present invention, when the frequency of the oscillation signal, i.e., the output of the z-axis modulation signal generator, is set to f4, the amplitude of vibration of the cantilever 2 is varied most sensitively in accordance with the distance between the probe 1 and the sample 3.

For this reason, the oscillation frequency of the z-axis modulation signal generator 4 is determined to f4. Further, two kinds of output amplitudes of the z-axis modulation signal generator are set by the instructions from the controller 11, so as to obtain an amplitude of 5 nm to several tens nm used to measure the magnetic inclination and an amplitude of 50 nm to several hundreds nm used to measure the ruggedness signal.

Figures 3A, 3B:
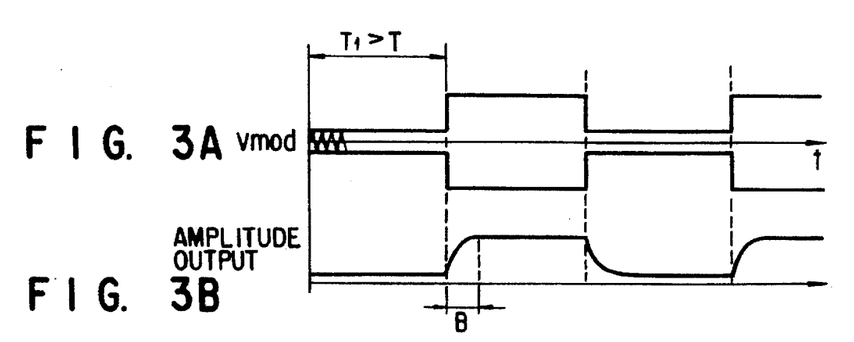
FIGS. 3A and 3B are diagrams showing the state in which signals of two output amplitudes are generated alternately at intervals of at least ten times a period of the amplitude by vibration.

FIGS. 3A and 3B show the state in which the cantilever is oscillated alternately with the two output amplitudes at intervals. A time T1 is at least longer than a response time T of the cantilever, estimated on the basis of the resonance frequency f1 and the Q value of the cantilever. For example, assuming that the time T is a period of time in which an attenuation amplitude of a one-dimensional harmonic vibration is reduced to $\frac{1}{10}$, T is represented by the following equation:

$$T = \frac{1}{f_1} \cdot \frac{Q}{\pi \times \log_{10}e}$$

For example, when the Q value is 20 and f1 is 30 kHz, the time T is 0.5 ms and the wavenumber (f1×T) is 15. Thus, it is understood that a period of time of 15 times the period of the oscillation frequency is required to measure the change characteristic of the oscillation amplitude. The measurement time T1 is determined on the basis of this calculation.

The amplitude is changed in the aforementioned manner at least twice, and the period of time, in which the change in amplitude is reduced to $\frac{1}{10}$ or less, is measured. The time is, for example, 1 msec, which is a rate-determining value at each point when the change of the amplitude by vibration is servo-controlled. Assuming that the sampling interval for measuring the ruggedness of the sample is 256 points for every scanning line, a period of scan time of at least 256 msec is required for one way of the scanning line. The scanning rate is determined on the basis of this value.

The calculation of the scanning rate is also applicable to a case of setting a scanning rate in the normal AC mode.

At this time, a curve portion B of the change in an amplitude signal, which is changed from the amplitude for measuring the magnetic inclination to the amplitude for measuring the ruggedness, is stored in a memory incorporated in the controller 11.

A measurement operation will be described with reference to the timing chart shown in FIG. 4.

First, as described before, the cantilever is vibrated in the z-direction in the specified frequency, to change the amplitude by vibration, so that a transient characteristic of vibration based on the change characteristic of the oscillation amplitude can be measured.

Figure 4A:
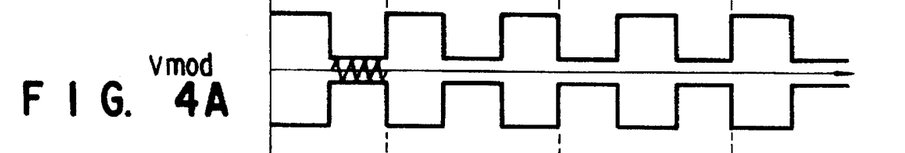
FIGS. 4A to 4J are timing charts for explaining a measurement operation of the first embodiment.
Figure 4B:
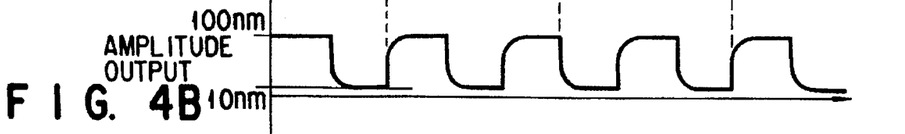

Then, to control the relative position between the sample 3 and the probe 1, for example, in a state where the probe is vibrated at an amplitude of 120 nm, the sample 3 and the probe 1 are caused to approach each other. When the amplitude of the cantilever 2 becomes, for example, 100 nm, the servo operation by the servo section is turned on. The chart Vmode in FIG. 4A represents an envelope of an amplitude output from the z-axis modulation signal generator 4 for oscillating the cantilever at this time.

Figure 4C:
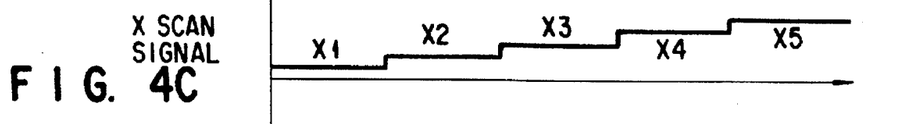
Figure 4D:
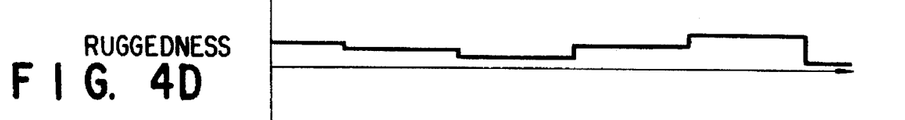
Figures 4E, 4F:
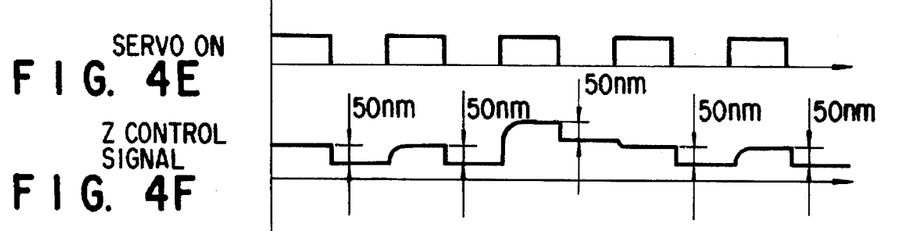

The xy scanner 10 brings a measurement start position X1 of the sample 3, as shown in the chart of the X scan signal in FIG. 4C, to a portion under the probe 1. A ruggedness signal at the position X1 in the chart of the ruggedness signal in FIG. 4D is picked up at the ruggedness sample timing as shown in the ruggedness sample in FIG. 4H. Then, the controller 11 outputs an instruction to the z-position control mechanism 9 to stop the servo operation as indicated by the chart of the servo-on signal in FIG. 4E, and removing the probe 1 from the sample 3 additionally by 50 nm from the z position controlled by the servo control as indicated by the chart of the z-control signal in FIG. 4F. The controller 11 also outputs to the z-axis modulation signal generator an instruction for reducing the output amplitude to, for example, $\frac{1}{10}$ that in the ruggedness measuring operation.

Figure 4G:
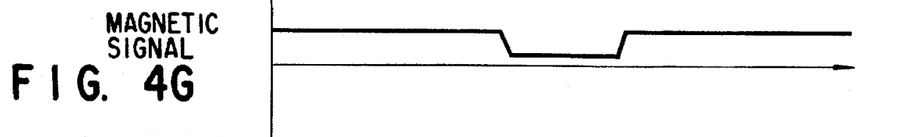
Figure 4H:
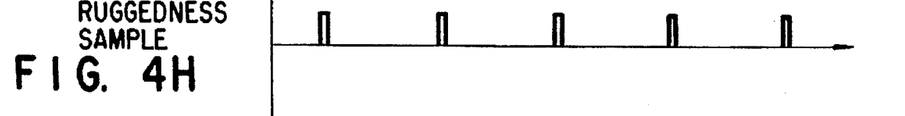
Figure 4I:
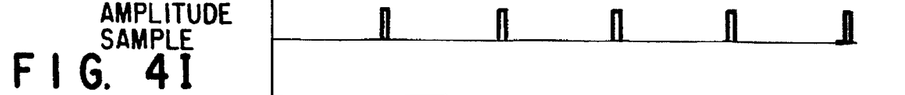

As a result, the probe 1 is vibrated at an amplitude of 10 nm at a position 150 nm apart from the surface of the sample 3. The vibration is settled in a predetermined time in accordance with the time constant of the change in amplitude which has been measured in advance. After this time has been elapsed, to obtain a distribution of the magnetic force inclination, an amplitude signal corresponding to a magnetic signal indicated by the chart of the magnetic signal in FIG. 4G is picked up at an amplitude sample timing as indicated by the amplitude sample in FIG. 4I by the image analysis device 13 through the controller 11.

Figure 4J:
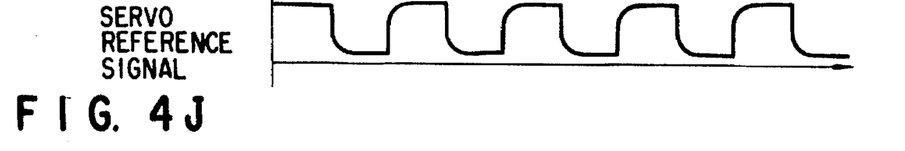

During that time, it is unnecessary to set a reference signal indicated by the chart of the servo reference signal in FIG. 4J. However, for the sake of convenience, the reference signal is set to the same value as the amplitude signal of the cantilever. Then, the servo operation is restarted as indicated by the chart of the servo on signal in FIG. 4E. At this time, the controller 11 performs a calculation of adapting the curve of the vibration displacement, measured by and stored in the controller 11 as indicated by the chart of the servo reference signal in FIG. 4J, to the curve which is assumed to be varied from the amplitude of the cantilever measured to obtain the magnetic force inclination to the set servo amplitude. The servo reference signal supplied from the reference signal generator 12 to the z-position controller 9 is varied in accordance with the curve obtained in the manner as described above.

Thus, the reference signal is varied in accordance with the change in vibration, so that the servo operation may not delay in accordance with the change in vibration of the cantilever 2.

Under the servo operation, an x scan signal is varied as indicated by the chart of the x scan signal in FIG. 4C, and the sample 3 is moved to a next point X2. This operation is repeated with respect to all the points of measurement. As a result, the image analysis device can obtain, as two pieces of numerical data, the ruggedness information of the sample and the amplitudes by vibration of the magnetic probe 1 at the height of exactly 150 nm from the sample surface over all the scan range. The image analysis device 13 displays the two pieces of data on the measurement coordinates, during or after the measurement operation.

In this manner, it is possible to measure the ruggedness of the sample and the distribution of the magnetic force inclination at a constant height from the sample surface, obtained at substantially the same time, i.e., within a time difference corresponding to the transient response time of the cantilever.

A second embodiment, in which a magnetic force image is detected by means of a phase difference, will be described with reference to FIGS. 5 and 6. In FIG. 6A, m represents a standard curve of vibration characteristics of a probe, n represents a curve of the same shifted to lower frequencies due to the magnetic influence. In FIG. 6B, r represents a standard curve of a phase characteristics of an oscillation signal and p presents a curve of the same of a displacement output signal of the cantilever.

As described above, when the cantilever having a magnetic probe at its free end detects a magnetic inclination of attraction or repulsion at a height of 10 nm to several hundreds nm above the sample surface, the peak of the resonance characteristic is shifted to a lower frequency side or higher frequency side, as shown in FIG. 6A. As shown in FIG. 6B, when the shift occurs, the phase difference between the oscillation signal r and the displacement output signal p of the cantilever is the greatest in the resonance frequency f1. Hence, if the cantilever is oscillated in the resonance frequency f1 and a phase difference signal $\phi$ has been detected, the force inclination which acts on the cantilever can be detected.

Figure 5:
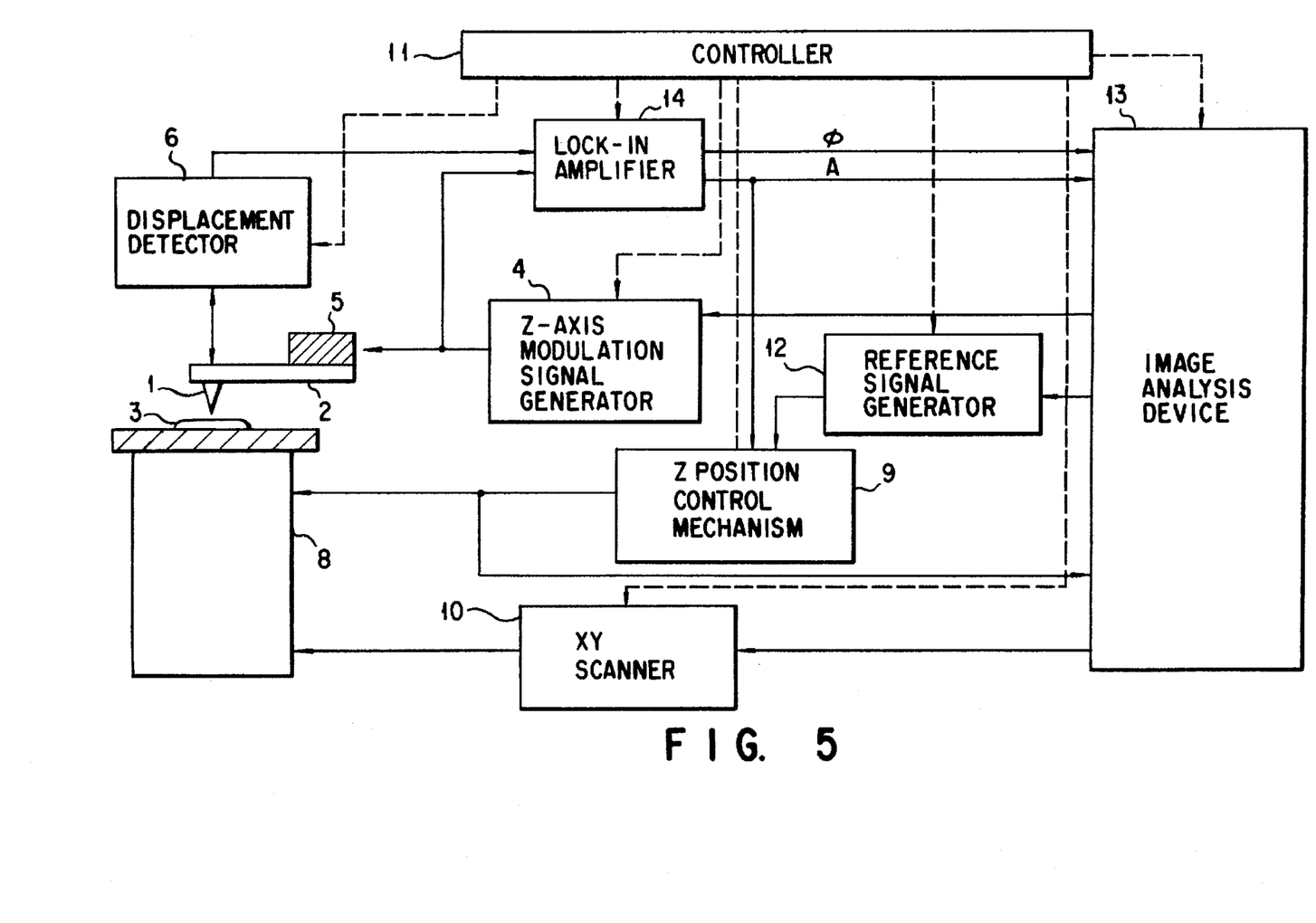
FIG. 5 is a schematic diagram showing a scanning probe microscope for explaining a scanning method with a scanning probe microscope according to a second embodiment of the present invention.
Figure 6A:
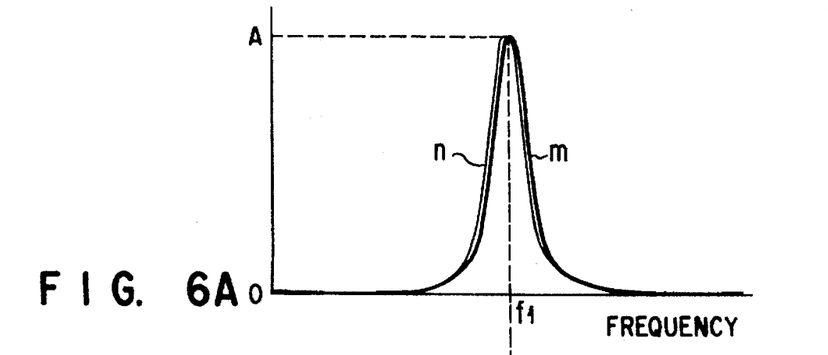
FIG. 6A is a characteristic diagram showing the frequency-dependency of the amplitude of a displacement signal.
Figure 6B:
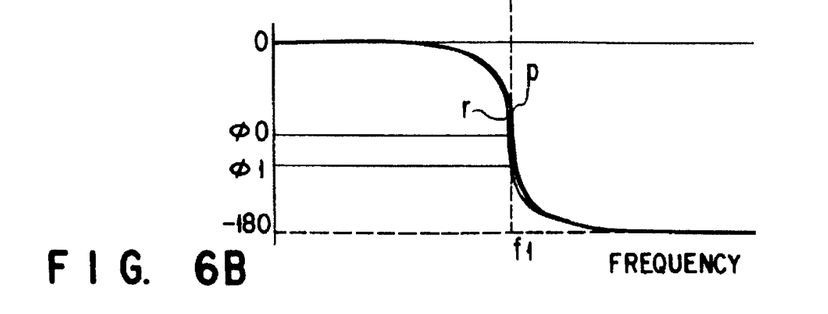
FIG. 6B is a characteristic diagram showing the frequency-dependency of the phase of a displacement signal.

In this case, the amplitude detector shown in FIG. 1 is replaced with a lock-in amplifier 14 shown in FIG. 5. An amplitude signal A and a phase signal $\phi$ output from the lock-in amplifier 14 are connected to the image analysis device 13. The amplitude signal A is also connected to the z-position control mechanism 9, so that it can be used as a signal for performing a z-position control of the sample.

A measurement operation with the above structure, based on the timing charts shown in FIGS. 4A to 4J, are different from the first embodiment in that a phase shift signal $\phi$ representing the magnetic force inclination is picked up when the servo operation is off. The positioning of the probe with respect to the ruggedness of the sample is performed in the same manner as that in the first embodiment (the description thereof is omitted). Thus, signals representing the ruggedness of the sample and the magnetic force inclination can be picked up simultaneously.

As has been described above, according to the scanning probe microscope of the present invention, the scanning rate can be optimized using the transient characteristic of the vibration of the cantilever, which has been measured in advance.

In addition, according to the present invention, an operation of measuring the ruggedness and an operation of measuring the influence of the magnetic force inclination can be performed at every point of measurement. As a result, a distribution of the ruggedness of the sample and a distribution of the magnetic force can be separately detected with less displacement of points of measurement.

Further, according to the present invention, the transient characteristic of vibration of the cantilever is measured before the measurement and a reference signal used in switching the servo operation is produced by using the transient characteristic. It is therefore possible to provide a scanning probe microscope of the measurement switching type, which can optimize the scanning time.

There are some modifications of the embodiment explained below. When a probe is exchanged, if an approximate characteristic of frequency of the probe is known in advance, it is unnecessary to measure the transient characteristic. If an approximate characteristic of frequency of each probe is within a certain range, it is only necessary that the following relationship be satisfied:

In this case, if T is determined such that the amplitude of the attenuation of a one-dimensional harmonic vibration is reduced to sufficiently less than $\frac{1}{10}$, the transient characteristic of the cantilever need not be measured each time the cantilever is exchanged.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A scanning method with a scanning probe microscope, comprising the steps of:

a transient characteristic measuring step of vibrating in a direction perpendicular to a sample a cantilever provided with a probe having magnetism in a specified frequency above a desired measurement position on a surface of the sample, and changing an amplitude by vibration, thereby measuring a transient characteristic of vibration inherent to the cantilever;

a servo operation step of causing the probe to approach a sample, setting a first oscillation voltage to cause the probe to vibrate at a first predetermined amplitude, and thereafter scanning the sample with the probe;

a servo signal recording step of recording a servo signal obtained by the servo operation step as information on a shape of a surface of the sample;

a magnetic signal recording step of stopping the servo operation, varying a distance between said cantilever and the surface of the sample, applying a second oscillation voltage to said cantilever so as to oscillate the cantilever at a second predetermined amplitude, which is lower than the first predetermined amplitude, and recording a magnetic signal pertaining to the sample, the magnetic signal being produced based on the oscillation of the cantilever at the second predetermined amplitude;

a servo control step of returning the probe, after said magnetic signal has been recorded, to a height where the probe is positioned in the servo operation step, resetting the second oscillation voltage to the first oscillation voltage, and when the servo operation is successively executed to obtain information on the surface of the sample, sampling the servo signal after a predetermined period of time, which does not influence the transient characteristic, has been elapsed since scanning with the probe started; and an image analyzing step of imaging the information on the surface of the sample and distribution of magnetic force inclination by repeating the servo operation step to the servo control step at each of all points of measurement set in advance on the sample.

2. The scanning method with a scanning probe microscope according to claim 1, wherein in said image analyzing step, the servo operation is controlled to be turned on or off at a predetermined timing; a ruggedness image of the surface of the sample is image-analyzed using a servo signal, obtained at a time when the servo operation is on, in association with a position of the sample at the time; and the distribution of the magnetic force inclination at a height above the sample excluding influence of ruggedness of the sample is image-analyzed using the oscillation signal of the cantilever, obtained at a time when the servo operation is off, in association with a position of the sample at the time.

3. The scanning method with a scanning probe microscope according to claim 1, wherein the oscillation signal of the amplitude by vibration of the cantilever is detected by lock-in detection on the basis of a signal of the specified frequency of the amplitude by vibration of the cantilever and a displacement signal of the cantilever.

4. The scanning method with a scanning probe microscope according to claim 1, wherein said transient characteristic measuring step comprises the steps of:
  determining a resonance frequency of said cantilever;
  determining a Q value of a resonance characteristic of said cantilever; and
  measuring a time in which the amplitude of a one-dimensional harmonic vibration is reduced to 10% or less, based on said resonance frequency and the Q value of said resonance characteristic.

5. The scanning method with a scanning probe microscope according to claim 1, wherein in said magnetic signal recording step said magnetic signal is recorded in accordance with a variation of a frequency signal generated when the cantilever is oscillated at a frequency in the vicinity of a resonance frequency.

6. The scanning method with a scanning probe microscope according to claim 1, wherein in said magnetic signal recording step said magnetic signal is recorded based on a phase difference signal generated when the cantilever is oscillated at a resonance frequency.

7. A scanning method with a scanning probe microscope, comprising the steps of:
  a servo operation step of causing a cantilever provided with a probe having magnetism to approach a sample at a measurement position on the sample, setting a first oscillation voltage to cause the probe to vibrate at a first predetermined amplitude, and thereafter scanning the sample with the probe;
  a servo signal recording step of, after a predetermined period of time has been elapsed since the first oscillation voltage was applied until the amplitude of the probe is stabilized, recording a servo signal obtained by the servo operation step as information on a shape of a surface of the sample;
  a magnetic signal recording step of stopping the servo operation, varying a distance between said cantilever and the surface of the sample, applying a second oscillation voltage to said cantilever so as to oscillate the cantilever at a second predetermined amplitude, which is lower than the first predetermined amplitude, and recording a magnetic signal pertaining to the sample, the magnetic signal being produced based on the oscillation of the cantilever at the second predetermined amplitude;
  a servo control step of returning the probe, after said magnetic signal has been recorded, to a height where the probe is positioned in the servo operation step, resetting the second oscillation voltage to the first oscillation voltage, and when the servo operation is successively executed to obtain information on the surface of the sample, sampling the servo signal after a predetermined period of time, which is required to stabilize the amplitude of the probe, has been elapsed since scanning with the probe started; and
  an image analyzing step of imaging the information on the surface of the sample and distribution of magnetic force inclination by repeating the servo operation step to the servo control step at each of all points of measurement set in advance in the sample.

8. The scanning method with a scanning probe microscope according to claim 7, wherein in said magnetic signal recording step said magnetic signal is recorded in accordance with a variation of a frequency signal generated when the cantilever is oscillated at a frequency in the vicinity of a resonance frequency.

9. The scanning method with a scanning probe microscope according to claim 7, wherein in said magnetic signal recording step said magnetic signal is recorded based on a phase difference signal generated when the cantilever is oscillated at a resonance frequency.

10. A scanning method with a scanning probe microscope, comprising the steps of:
  a servo operation step of causing the probe vibrating with a desired amplitude to approach a sample, setting a first oscillation voltage to cause the probe to vibrate at a first predetermined amplitude, and thereafter scanning the sample with the probe;
  a servo signal recording step of recording a servo signal obtained by the servo operation step as information on a shape of a surface of the sample;
  a magnetic signal recording step of stopping the servo operation, varying a distance between said cantilever and the surface of the sample, applying a second oscillation voltage to said cantilever so as to oscillate the cantilever at a second predetermined amplitude, which is smaller than the first predetermined amplitude, and recording a magnetic signal pertaining to the sample, the magnetic signal being produced based on the oscillation of the cantilever at the second predetermined amplitude;

a servo control step of returning the probe, after said magnetic signal has been recorded, to a height where the probe is positioned in the servo operation step, resetting the second oscillation voltage to the first oscillation voltage, and when the servo operation is successively executed to obtain information on the surface of the sample, sampling the servo signal after a predetermined period of time, which does not influence a transient characteristic of the probe, has been elapsed since scanning with the probe started; and an image analyzing step of imaging the information on the surface of the sample and distribution of magnetic force inclination by repeating the servo operation step to the servo control step at each of all points of measurement set in advance in the sample.

11. The scanning method with a scanning probe microscope according to claim 10, wherein in said magnetic signal recording step said magnetic signal is recorded in accordance with a variation of a frequency signal generated when the cantilever is oscillated at a frequency in the vicinity of a resonance frequency.

12. The scanning method with a scanning probe microscope according to claim 10, wherein in said magnetic signal recording step said magnetic signal is recorded based on a phase difference signal generated when the cantilever is oscillated at a resonance frequency.

* * * * *